Oct. 21, 1941.   G. T. WOODRUFF ET AL   2,260,246
UNDERINFLATION AND OVERINFLATION TIRE SIGNAL
Filed April 14, 1938
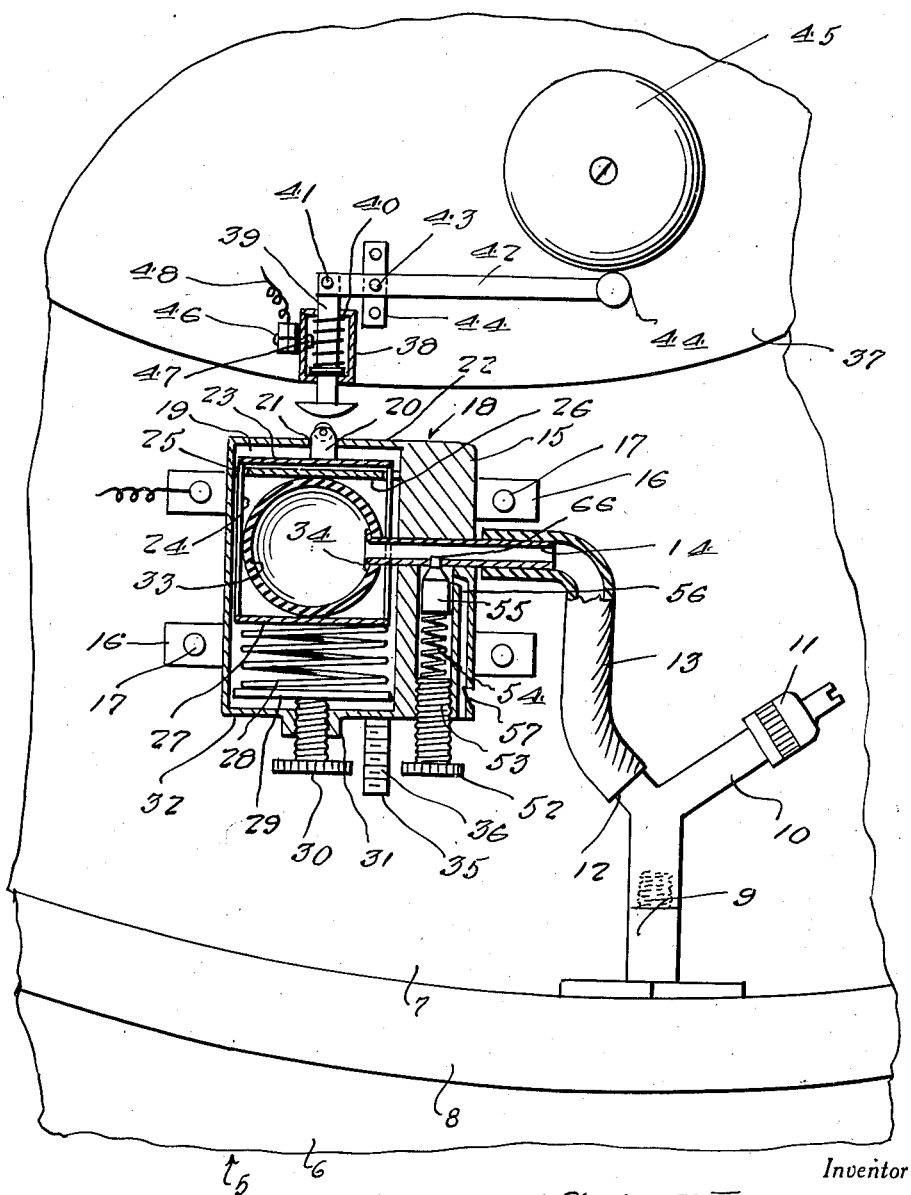
Inventor
G. T. Woodruff
I. B. Jones
By Clarence A. O'Brien
Hyman Berman
Attorneys Patented Oct. 21, 1941

2,260,246

UNITED STATES PATENT OFFICE 2,260,246

UNDERINFLATION AND OVERINFLATION TIRE SIGNAL

George T. Woodruff and Ira B. Jones, Decatur, Ala.

Application April 14, 1938, Serial No. 202,098

6 Claims. (Cl. 137—156)

Our invention relates generally to means for positively warning the driver of an automobile of a condition of underinflation or overinflation of any of the pneumatic tires of the automobile, and particularly to a combined mechanical and electrical arrangement of this character which can operate both visible and audible signals warning of a condition of underinflation of the tire, and also an audible signal of escape of air under conditions of overinflation of the tire, and an important object of our invention is to provide a simple, efficient, and relatively low cost arrangement of this character.

Other important objects of our invention will be apparent from a reading of the following description taken in connection with the drawing, wherein for purposes of illustration we have shown a preferred embodiment of our invention.

In the drawing:

The figure is an enlarged fragmentary elevational and sectional view showing details of the pressure operated switch mechanism and of the mechanically operated signal bell, and showing the same mounted on portions of a brake drum housing and of the related pneumatic tire-equipped wheel.

Referring in detail to the drawing, the numeral 5 generally designates one of the wheels of an automobile including the pneumatic tire 6 mounted on the rim 8 on the metallic wheel element 7. In accordance with the present invention the usual valve stem projecting through the rim portion 8 of the wheel has screwed thereon a Y-connection 9 one branch 10 of which is provided with the usual inflating valve mechanism (not shown) and may include the usual valve cap 11. The other arm 12 of the Y-connection is connected by means of a flexible tube 13 with the tube 14 which projects from one side of the block 15 which is secured to the web of the wheel element 7 by means of ears 16 fastened by bolts 17, the block constituting the housing for the pressure responsive mechanism which is generally designated 18. The block has a chamber 19 which is closed at its top and bottom ends and extends along one side of the block with the tube 14 reaching into the chamber 19 as clearly shown in Figure 2 of the drawing. A roller equipped lug 20 slidably projects through an opening 21 in the top wall 22 of the chamber 19 and the lug is attached to a plate 23 which has legs 24 depending through openings 25 in the plate 26 which is fastened in the chamber below the plate 23 and in spaced relation to the top plate 22. Secured to the bottom of the legs 24 is the pressure plate 27 which bears upon the upper end of an expansible helical spring 28 which rests on a plate 29 which in turn rests on the upper end of a pressure adjusting screw 30 which is threaded in a neck 31 in the bottom plate 32 of the chamber 19.

Confined in the chamber 19 between the plate 26 and the plate 27 is a collapsible bulb 33 which may be of any suitable construction or be a plain spherical rubber bulb adapted to hold air under pressure led thereinto by the tube 14 which enters the bulb and is fastened thereto at the point 34. A depending lug 35 secured to the bottom of the block 15 is disposed alongside of the screw 30 and the lug 35 has pressure graduations 36 thereon to be read in connection with the head of the screw 30 to indicate proper adjustment of the screw 30 according to the tire pressure desired to be maintained.

Attached to the automobile, preferably to the stationary brake drum housing 37 thereof is an insulated casing 38 which forms a housing for the vertically or radially movable plunger 39 which is pressed toward the roller equipped lug 20 of the pressure responsive switch mechanism by a spring 40 within the casing. The radially inward end of the plunger 39 is pivoted as indicated by the numeral 41 to one end of the lever 42 which is fulcrumed as indicated by the numeral 43 on a suitable bracket 44 attached to the brake drum housing 37, and the free end of the lever 42 has a hammer head 44 thereon arranged in relation to a bell 45 or other suitable sounder which is attached to the brake drum structure. The casing 38, the arm 42, and the bell 45 are insulated from each other and from the brake drum housing 37. The housing 38 also mounts a binding post 46 which has a contact 47 in engagement with the plunger.

Considering the device in its aspect as an electrical signaling arrangement, the binding post 46 will have a wire 48 leading therefrom to one side of the visible electrical signal 49 relating to the particular tire and forming one signal element of the signaling device which is generally designated 50 and adapted to be placed in any suitable location in the driving compartment of the automobile. The opposite side of the individual signal 49 is connected to one side of the battery 51 whose opposite side is grounded as indicated by the numeral 52. Each of the signal elements 49 is similarly arranged. The block 15 of the pressure responsive switch organization is grounded to the metal of the wheel element and when the roller equipped lug 20 touches the head of the plunger 39 the circuit is completed to the particular signal 49.

The screw 30 having been adjusted relative to the indicator 35 to the pressure desired to be maintained in the tire, and this pressure having been introduced into the tire by means of the inflating arm 10 of the Y-fitting 9, the bulb 33 will be expanded and will keep the roller equipped lug 20 in a radially inward position and away from the head of the plunger 39. However, when the tire pressure goes below the selected pressure, the bulb 33 collapses somewhat and permits the spring 28 to force the cage on which the lug 20 is mounted in a radially inward direction and into contact with the head of the plunger 39. This engagement of the lug 20 with the plunger 39 takes place once every revolution of the wheel. The electrical connection to the appropriate signal 49 is established by the engagement of the lug 20 with the plunger 39, for reasons already stated, but in addition to this, there is the additional reserve signal provided by the bell 45 which is struck by the hammer head 44 as electrical contact is made, by reason of the displacement of the plunger 39 by the engagement therewith of the lug 20 as the wheel revolves; so that the driver of the automobile is positively warned of the underinflated condition of the tire, even though the electrical arrangement has failed.

A safety valve arrangement is provided in the device 13 to insure avoidance of an overinflated condition of the tire and this includes the adjustable screw 52 which is capable of being accurately adjusted for pressure maintenance by reference to the pressure scale 35, and this screw 52 is threaded in an opening 53 arranged parallel with the chamber 19 in the block 15 and reaching to the tube 14. The screw 52 works directly against a spring 54 which bears against the bottom of a valve element 55 which has a part 66 normally seating in and closing an opening in the side of the tube 14. When the tire has been inflated too much or becomes in any other way overinflated beyond the pressure for which the screw 52 was adjusted, the valve element 55 will be forced downwardly against the resistance of the spring 54 and will permit the air coming through the tube 14 to escape into the outlet passage 56 which opens into the top of the opening 53. In order that the driver may not be led by the hissing sound of the escaping air to believe that the tire is punctured, when a release of overinflation takes place, the relief passage 56 is provided with a suitably shaped opening 57 near its lower end whereby a distinctive whistling sound is procured as the pressure is relieved.

Although we have shown and described herein a preferred embodiment of our invention, it is to be definitely understood that we do not desire to limit the application of the invention thereto, and any change or changes may be made in the materials, and in the structure and arrangement of the parts, within the spirit of the invention and the scope of the subjoined claims. It will be evident that the device may be used as a mechanical device or as an electrical device.

Having described the invention, what is claimed as new is:

1. A device of the character described, said device comprising a housing, said housing comprising a chamber, a normally expanded bulb located in said chamber, said bulb having an air tube extending therefrom and connectible with a source of air under pressure, a cross member mounted in said chamber adjacent one end thereof, a frame including a lug extending through an opening formed in the said one end of said chamber, said frame being confined in said chamber for movement relative to said cross member toward and away from said one end of the chamber, said bulb having a side thereof engaged with said cross member and said frame having a transverse member engaging the opposite side of said bulb, and expanding spring means confined between the remaining end of said chamber and said transverse member of the said frame, in a manner to move said frame to project said lug from its opening whenever the air pressure in said bulb is insufficient to resist the expanding action of said spring means and the bulb collapses.

2. A device of the character described, said device comprising a housing, said housing comprising a chamber, a normally expanded bulb located in said chamber, said bulb having an air tube extending therefrom and connectible with a source of air under pressure, a cross member mounted in said chamber adjacent one end thereof, a frame including a lug extending through an opening formed in the said one end of said chamber, said frame being confined in said chamber for movement relative to said cross member toward and away from said one end of the chamber, said bulb having a side thereof engaged with said cross member and said frame having a transverse member engaging the opposite side of said bulb, and expanding spring means confined between the remaining end of said chamber and said transverse member of the said frame, in a manner to move said frame to project said lug from its opening whenever the air pressure in said bulb is insufficient to resist the expanding action of said spring means and the bulb collapses, and adjustable means for increasing or decreasing the compression of said expanding spring means.

3. A device of the character described, said device comprising a housing comprising a chamber, said chamber having an interior abutment, a cage movably enclosed in said chamber for movement toward and away from one end of the chamber relative to said abutment, a lug on said cage arranged to project through an opening provided in said one end of the chamber, a transverse member on said cage, a normally expanded bulb in said chamber, said bulb being operatively confined between said transverse member and said abutment, an air pressure inlet tube connected with said bulb, and expanding spring means confined between said transverse member and an adjacent portion of said chamber for moving said cage toward the said one end of the chamber to project said lug when an insufficient air pressure in the bulb permits said spring means to collapse the bulb.

4. In a device of the character described, a compressible substantially spherical bulb having a tubular extension adapted for connection to a source of air under pressure, a stationary support, a frame movably mounted on said support and having a portion engaged with a side of the bulb, a spring connected between said support and said frame, a stationary abutment on said support with which an opposite side of the bulb engages, said spring being arranged to move said frame in a direction to compress said bulb when an insufficient air pressure exists in said bulb to resist such action of the spring.

5. In a device of the character described, a support, an air pressure inlet conduit on said support and adapted for connection to a source of air pressure, an inflatable bulb connected to said air pressure inlet tube, a lug mounted for movement relative to said support, a movable frame on said support and connected to said lug, said frame including a pressure plate, a stationary element on said support relative to which said frame and lug are movable, said inflatable bulb being engaged between said pressure plate and said stationary element so as to position said frame to maintain said lug in a retracted position while said bulb is expanded by predetermined air pressure entering through said inlet tube, and spring means on said support and connected with said frame for moving said frame in an opposite direction to collapse said bulb and project said lug whenever insufficient air pressure exists in said bulb to resist the action of said spring means.

6. In a device of the character described, a support, an air pressure inlet conduit on said support and adapted for connection to a source of air pressure, an inflatable bulb connected to said air pressure inlet tube, a lug mounted for movement relative to said support, a movable frame on said support and connected to said lug, said frame including a pressure plate, a stationary element on said support relative to which said frame and lug are movable, said inflatable bulb being engaged between said pressure plate and said stationary element so as to position said frame to maintain said lug in a retracted position while said bulb is expanded by predetermined air pressure entering through said inlet tube, and spring means on said support and connected with said frame for moving said frame in an opposite direction to collapse said bulb and project said lug whenever insufficient air pressure exists in said bulb to resist the action of said spring means, and an operative element mounted in the path of said lug and arranged to be operatively engaged by said lug in its projected position.

GEORGE T. WOODRUFF.
IRA B. JONES.